(12) United States Patent
Zhou et al.

(10) Patent No.: US 8,973,614 B2
(45) Date of Patent: Mar. 10, 2015

(54) OUTLET SWITCH DEVICE AND AN OUTLET SWITCH METHOD

(75) Inventors: Huasong Zhou, Xiamen (CN); Zhongcheng Jin, Xiamen (CN); Jianmin Chen, Xiamen (CN); Bin Chen, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 276 days.

(21) Appl. No.: 13/579,238

(22) PCT Filed: Feb. 21, 2011

(86) PCT No.: PCT/CN2011/071127
§ 371 (c)(1),
(2), (4) Date: Aug. 15, 2012

(87) PCT Pub. No.: WO2011/103795
PCT Pub. Date: Sep. 1, 2011

(65) Prior Publication Data
US 2012/0312403 A1    Dec. 13, 2012

(30) Foreign Application Priority Data
Feb. 25, 2010    (CN) .......................... 2010 1 0114071
Feb. 25, 2010    (CN) ....................... 2010 2 0119079 U

(51) Int. Cl.
*F16K 11/072*    (2006.01)
*F16K 1/50*    (2006.01)
(Continued)

(52) U.S. Cl.
CPC ............. *F16K 11/074* (2013.01); *B05B 1/1609* (2013.01); *B05B 1/1681* (2013.01); *B05B 1/18* (2013.01); *F16K 11/0565* (2013.01)
USPC ...... 137/876; 251/230; 239/439; 137/625.44; 137/875; 137/879

(58) Field of Classification Search
USPC ............. 137/625.44, 875, 876, 879; 239/443, 239/444, 446, 447, 448, 449, 525, 530; 251/230, 280, 59; 60/439, 440, 493
See application file for complete search history.

(56) References Cited

U.S. PATENT DOCUMENTS 1,856,350 A  *  5/1932   Metcalf .......................... 137/554
4,629,124 A  *  12/1986   Gruber ........................ 239/428.5
(Continued)

FOREIGN PATENT DOCUMENTS

CN      201120344 Y     9/2008
CN      201180814 Y     1/2009
(Continued)

*Primary Examiner* — John Fox
*Assistant Examiner* — Seth W Mackay-Smith
(74) *Attorney, Agent, or Firm* — Rabin & Berdo, P.C.

(57) ABSTRACT

The outlet switch device includes a fixed unit, an outlet switch mechanism, an inlet switch mechanism and a driving mechanism. The outlet function switch is realized through the relative rotation between the outlet switch mechanism and the fixed unit; the fixed unit includes a control cavity and an inlet waterway connected to the external water resource; the outlet switch mechanism includes a switch plate, which is movable connected inside the control cavity and divides the control cavity into an upper cavity and a lower cavity; the inlet switch mechanism controls the inlet waterway to control the water turning into the upper cavity or the lower cavity, making the switch plate move up and down with the effect of the water; the driving mechanism is disposed between the switch plate and the fixed unit to transform the action up and down to rotation.

10 Claims, 7 Drawing Sheets

(51) Int. Cl.
*F16K 17/04* (2006.01)
*F16K 11/074* (2006.01)
*B05B 1/16* (2006.01)
*B05B 1/18* (2006.01)
*F16K 11/056* (2006.01)

(56) References Cited

U.S. PATENT DOCUMENTS

| | | | |
|---|---|---|---|
| 4,841,590 A | 6/1989 | Terry et al. | |
| 5,022,426 A * | 6/1991 | Fischer | 137/119.03 |
| 5,083,589 A * | 1/1992 | Wilcock | 137/625.29 |
| 5,433,384 A * | 7/1995 | Chan et al. | 239/449 |
| 5,467,927 A * | 11/1995 | Lee | 239/383 |
| 2005/0258274 A1 * | 11/2005 | Wang | 239/393 |

FOREIGN PATENT DOCUMENTS

| | | |
|---|---|---|
| CN | 101761671 A | 6/2010 |
| CN | 201603635 U | 10/2010 |
| JP | 2040251 A | 2/1990 |

\* cited by examiner

OUTLET SWITCH DEVICE AND AN OUTLET SWITCH METHOD

FIELD OF THE INVENTION

The present invention relates to bathroom hardware, especially to an outlet switch device and an outlet switch method.

BACKGROUND OF THE INVENTION

The existing outlet switch mechanism of bathroom hardware mainly includes rotation type and sling type. The rotation type realizes outlet switch by relative rotation between the water diversion body and the fixed unit. The sliding type realizes outlet switch by the relative sliding between the water diversion body and the fixed unit. The switch of the existing rotation type is realized by the user exerting rotation force to drive the water diversion body rotating relative to the fixed unit, such as the Chinese utility model 200820101772.4 published in the Chinese patent database. As the switch is realized by the user exerting rotation force to drive the water diversion body rotating relative to the fixed unit, there are disadvantages below: firstly, it needs more force, and the switch is inconvenient; secondly, the user needs to judge the rotation angle to make the outlet switch accurately.

SUMMARY OF THE INVENTION

The present invention is provided with an outlet switch device and an outlet switch method, which overcomes the disadvantage of the existing outlet switch mechanism.

The technical proposal of the present invention is:

An outlet switch device includes a fixed unit, an outlet switch mechanism, an inlet switch mechanism and a driving mechanism, the outlet function switch is realized by the relative rotation between the outlet switch mechanism and the fixed unit; the fixed unit includes a control cavity and an inlet waterway connected to the external water resource; the outlet switch mechanism includes a switch plate, which is movably connected inside the control cavity and dividing the control cavity into an upper cavity and a lower cavity; the inlet switch mechanism controls the inlet waterway to control the water turning into the upper cavity or the lower cavity, making the switch plate move up and down with the effect of the water; the driving mechanism is disposed between the switch plate and the fixed unit to transform the action up and down into rotation.

In another preferred embodiment, the fixed unit includes a body and a water diversion plate, the body is hermetically fixed to the water diversion plate to form the control cavity; a first male ratchet of ring arranged and faced down is disposed at the bottom of the body, a second male ratchet of ring arranged and faced up is disposed on the top of the water diversion plate; a first female ratchet of ring arranged and faced up is disposed on the top surface of the switch plate, a second female ratchet of ring arranged and faced down is disposed on the bottom face of the switch plate;

When the water is flowing into the lower cavity, the switch plate moves upward with the effect of the water, the first female ratchet and the first male ratchet are cooperated together to make the switch plate rotating forward; when the water is flowing into the upper cavity, the switch plate moves downward with the effect of the water, the second female ratchet and the second male ratchet are cooperated together to make the switch plate rotating forward.

In another preferred embodiment, several water diversion holes of ring arranged are disposed on the water diversion plate, several inlet holes of throughout are disposed on the switch plate, the inlet holes are corresponding to the water diversion holes; the inlet waterway of the fixed unit includes a root waterway and two diversion waterways, the inlet switch mechanism is disposed between the root waterway and the diversion waterways, making the diversion waterway connected to the upper cavity situated in the connection status and the diversion waterway connected to the lower cavity situated in the closed status, the inlet switch mechanism is controlled to trigger the diversion waterway connected to the lower cavity connected and the diversion waterway connected to the upper cavity closed.

In another preferred embodiment, the inlet switch mechanism includes a sealing piece, a control button and an elastic body, under the effect of the elasticity of the elastic body working on the sealing piece, the sealing piece is hermetically connected to the diversion waterway of the lower cavity, the control button is controlled by the user to make the sealing piece move to be hermetically connected to the diversion waterway of the upper cavity.

In another preferred embodiment, a withstanding spring is disposed between the switch plate and the body.

In another preferred embodiment, the fixed unit includes an outlet mechanism, the outlet mechanism includes several outlet functions, and each outlet function is connected to the water diversion hole correspondingly.

In another preferred embodiment, the inlet switch mechanism further includes a pivot piece, one end of the pivot piece is pivot jointed to the fixed unit, the other end of the pivot piece is connected to the sealing piece, the control button is sliding connected to the fixed unit, and the control button is disposed with a control end outside the fixed unit and a withstanding end inside the fixed unit to withstand the pivot piece.

The second technical proposal of the present invention to solve the technical problem is as below:

An outlet switch method, wherein includes:

Step 10. control the inlet waterway to make the water source entering into the upper cavity or the lower cavity of the control cavity, the water in the upper or lower cavity makes the switch plate move up and down, the driving mechanism transforms the motion up and down of the switch plate to rotation;

Step 20. the switch of the outlet functions is realized by the relative rotation between the switch plate and the fixed unit.

In another preferred embodiment, the step 10 includes:

Step 11. control the inlet switch mechanism to make the water source entering into the lower cavity;

Step 12. the water of the lower cavity makes the switch plate move upward;

Step 13. the driving mechanism transforms the motion upward of the switch plate to rotation forward;

Step 14. release controlling to make the water entering into the upper cavity;

Step 15. the water of the upper cavity makes the switch plate move downward;

Step 16. the driving mechanism transforms the motion downward of the switch plate to rotation forward, the switch plate is hermetically contacted with the water diversion plate.

The third technical proposal of the present invention to solve the technical problem is as below:

An outlet switch device includes a fixed unit, an outlet switch mechanism, an inlet switch mechanism and a driving mechanism, the switch of the outlet functions is realized by the relative rotation between the outlet switch mechanism and the fixed unit; the fixed unit includes a control cavity and an inlet waterway to connect to the external water source; the outlet switch mechanism includes a switch plate, the switch plate is movably connected inside the control cavity; an elastic piece is disposed between the switch plate and the fixed unit, the elasticity of the elastic piece makes the switch plate move forwards; the inlet switch mechanism controls the inlet waterway to make the water flowing into the control cavity, when the water flowing into the control cavity makes the switch plate compressing the elastic piece and move backwards; the driving mechanism exerts force to the switch plate and the fixed unit to transform the motion up and down of the switch plate to rotation. Compared to the existing technology, the technical proposal of the present invention is applied with an inlet switch mechanism to control the water, the water produces energy, such as impact force and/or the buoyancy force, with the hydraulic force control the outlet switch mechanism, it solves the problems of the existing technology and brings advantages as below:

1. The switch of the inlet switch mechanism is convenient with little force;
2. the outlet switch is recycled if the user presses the button, the switch is convenient and quick with several outlet functions switch;
3. with cooperation of the ratchets, it transforms the motion up and down to rotating forward in single direction, realizing recycled outlet switch without position mechanism.
4. the switch plate is disposed with inlet holes, the water diversion plate is disposed with several water diversion holes, with the water pressure or the elasticity of the spring, each time the inlet switch mechanism is switched, the switch plate is hermetically contacted with the water diversion plate, the inlet holes are connected to one of the several water diversion holes with the rotation of the switch plate, realizing the outlet switch;
5. the switch plate is disposed with inlet holes, ensuring that the water of the upper cavity can flow into the water diversion holes through the inlet holes when the water flowing into the lower cavity drives the switch plate move upward, the structure is simple and reliable;
6. the diversion waterway of the inlet switch mechanism connected to the upper cavity is situated in the connected status, making sure that the switch plate is hermetically contacted with the water diversion plate;
7. the motion up and down of the switch plate drives the switch plate rotating, so the rotation angle of the switch plate is larger, the sliding distance of the switch plate can be made smaller.

BRIEF DESCRIPTION OF THE DRAWINGS

The present invention will be further described with the drawings and the embodiments.

DETAILED DESCRIPTION OF THE EMBODIMENTS

Figure 1:
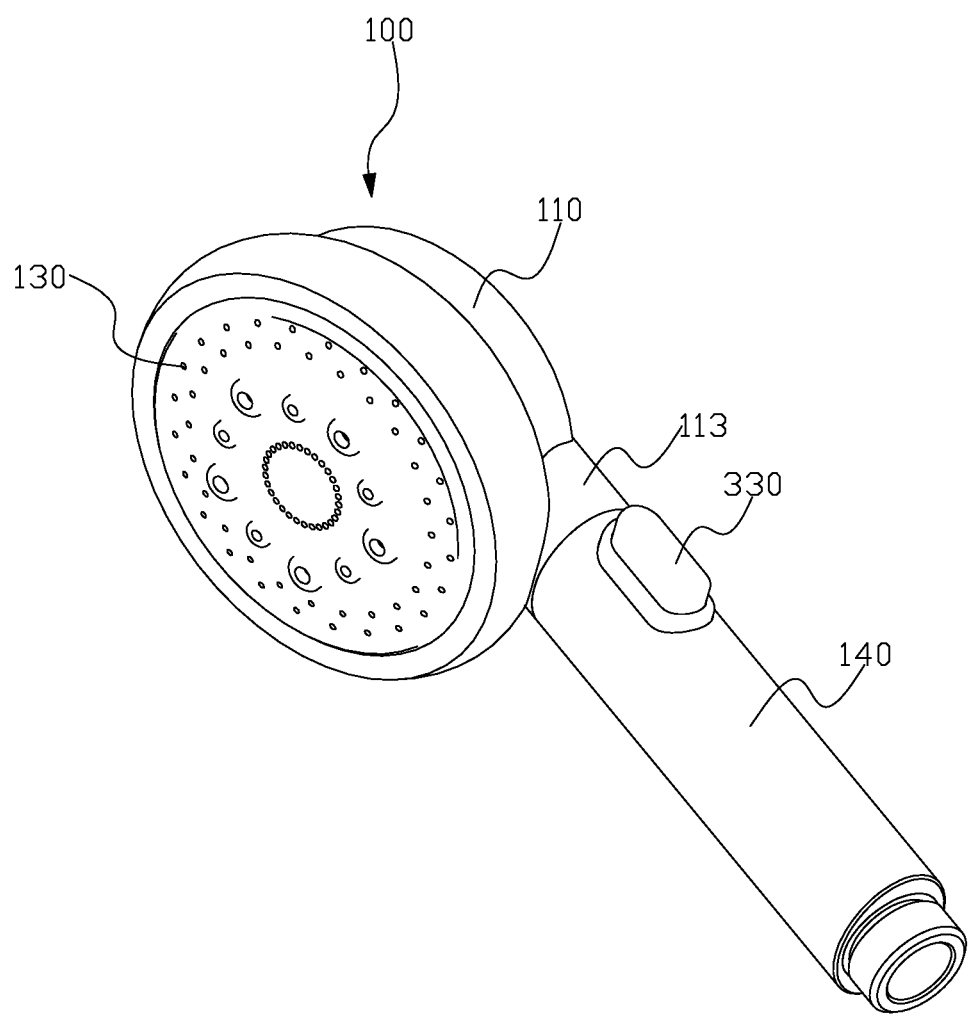
FIG. 1 illustrates the structure of the outlet switch device.
Figure 2:
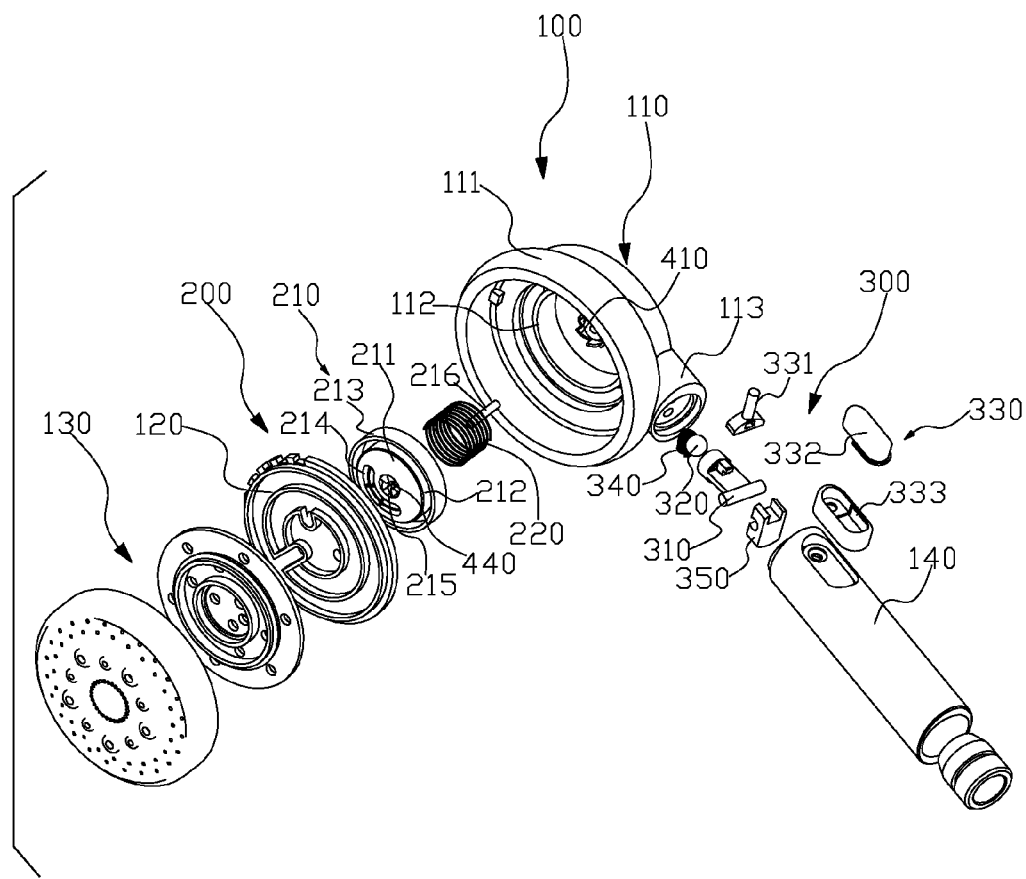
FIG. 2 illustrates the first breakdown structure of the outlet device.
Figure 3:
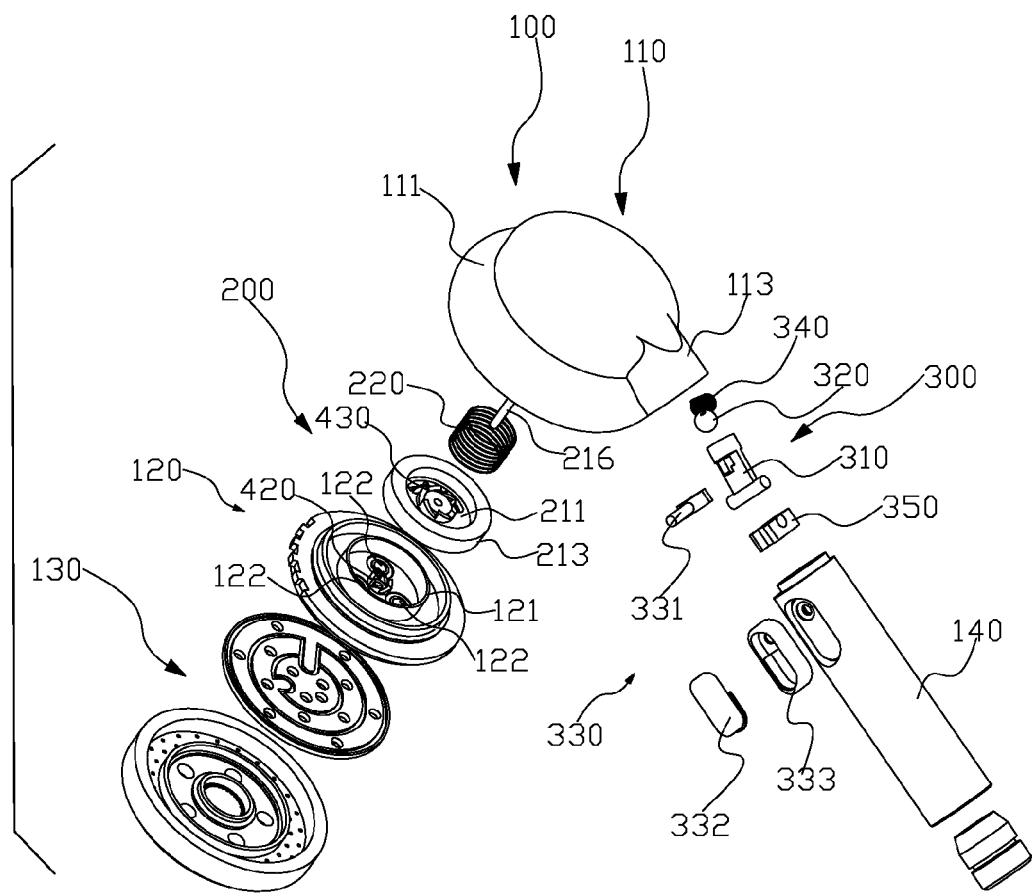
FIG. 3 illustrates the second breakdown structure of the outlet device.
Figure 4:
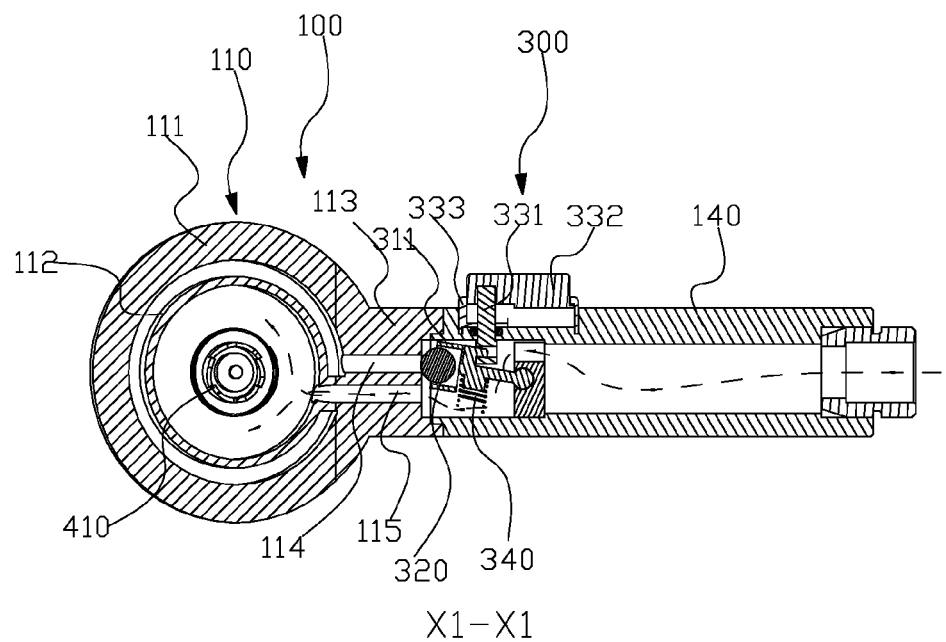
FIG. 4 illustrates the sectional view of the X1-X1 in the FIG. 5.
Figure 5:
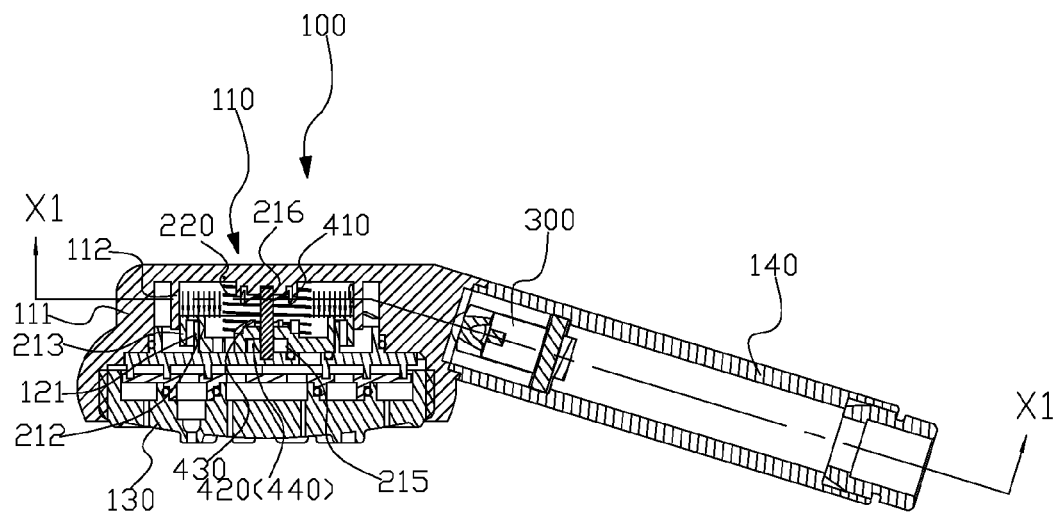
FIG. 5 illustrates the first sectional view of the outlet switch device to figure out the water pressure.
Figure 6:
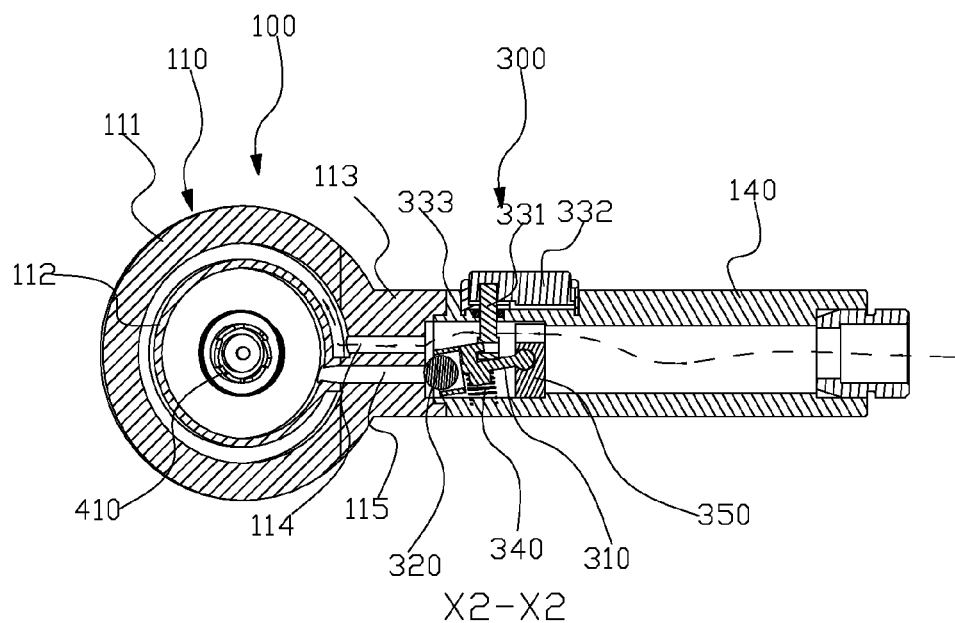
FIG. 6 illustrates the sectional view of the X2-X2 in the FIG. 7.
Figure 7:
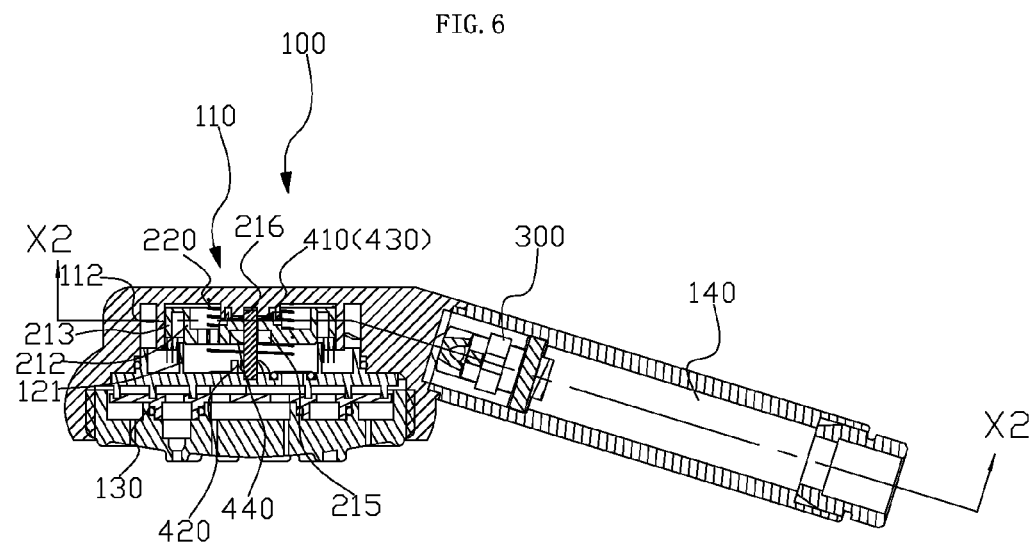
FIG. 7 illustrates the second sectional view of the outlet switch device to figure out the water pressure.
Figure 8:
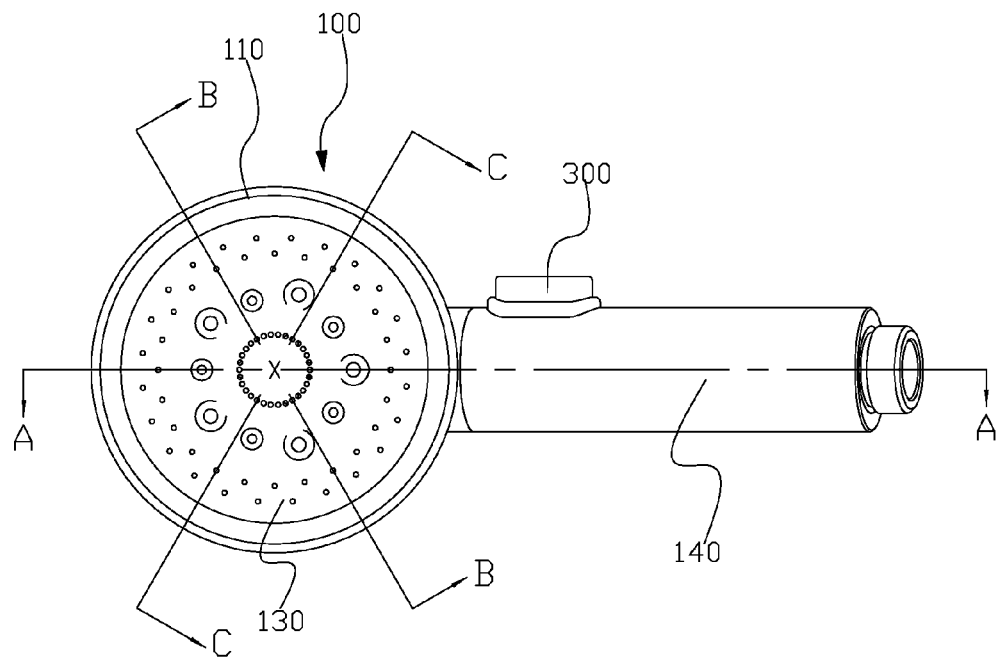
FIG. 8 illustrates the front view of the outlet switch device.
Figure 9:
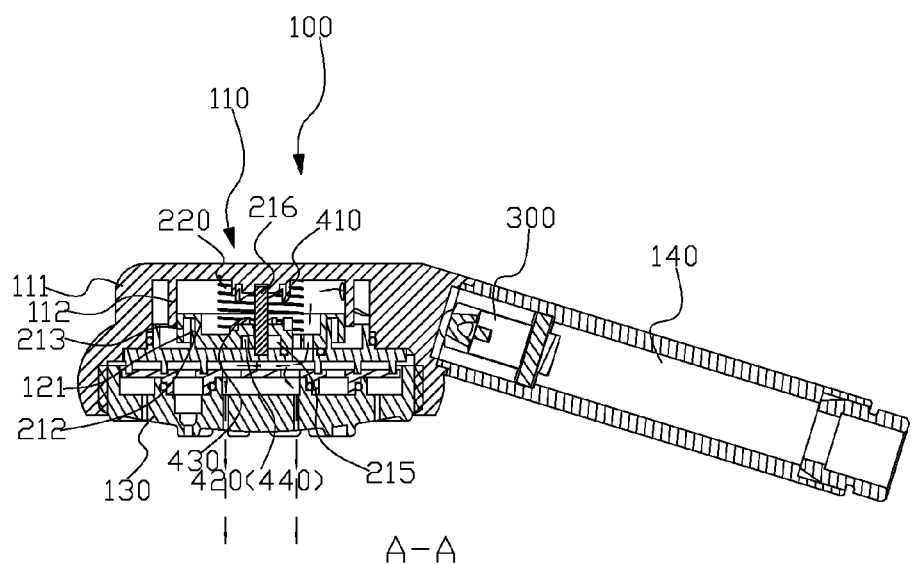
FIG. 9 illustrates the sectional view of the A-A in the FIG. 8 when the outlet device is situated in the first outlet function.
Figure 10:
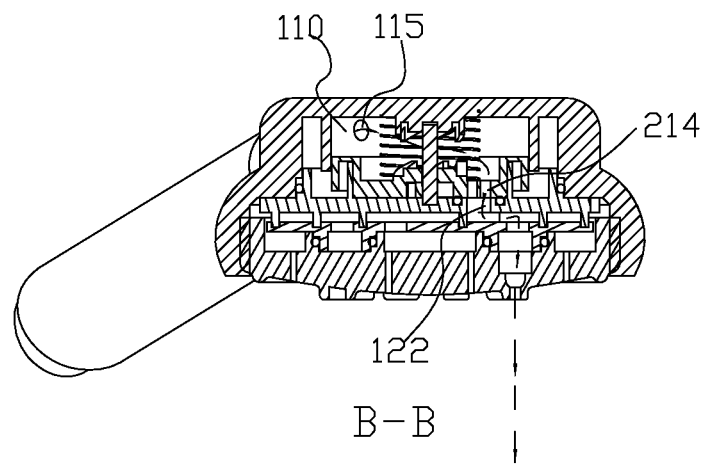
FIG. 10 illustrates the sectional view of the B-B in the FIG. 8 when the outlet device is situated in the second outlet function.

Refer to the FIG. 1, FIG. 2 and FIG. 3, the outlet switch device includes a fixed unit 100, an outlet switch mechanism 200, an inlet switch mechanism 300 and a driving device. In this embodiment, the outlet switch device is a shower, but not limited to this.

The fixed unit 100 includes a body 110, a water diversion plate 120, an outlet mechanism 130 and a handle 140. The body 110 includes a top board, a trumpet shaped sleeve 111 extended from the periphery of the top board, an upper inner periphery wall 112 fixed below the top board and situated inside the trumpet shaped sleeve coaxially and a joint 113 fixed outside the trumpet shaped sleeve. The handle 140 is screwed to the joint 113 to connect to the water, and an inlet cavity is disposed between the handle 140 and the joint 113. Two diversion waterways 114, 115 are disposed inside the body 110. The diversion waterways 114, 115 are separately defined as the upper diversion waterway 114 and lower diversion waterway 115, entries of which are disposed on the end face of the joint 113 up and down corresponding to the inlet cavity; the outlet of the upper diversion waterway 114 is disposed in the trumpet shaped sleeve 111, while the outlet of the lower diversion waterway 115 is disposed on the top of the upper inner periphery wall 112.

The water diversion plate 120 includes a plate, a connection wall extended upwards from the external periphery of the plate and a lower inner periphery wall 121 fixed on the plate, the connection wall is hermetically fixed to the trumpet shaped sleeve 111 of the body 110, the lower inner periphery wall 121 is disposed inside the upper inner periphery wall 112. Several water diversion holes 122 of ring shaped arranged are disposed in the portion inside the lower inner periphery wall 121 on the top surface of the water diversion plate 120. In this embodiment, there are three sets of water diversion holes 122, each set includes two water diversion holes of radically symmetrical, but not limited to this, if there are four outlets, it can be provided with four sets of water diversion holes; if there are five, it can be provided with five sets of water diversion holes. The outlet mechanism 130 is fixed below the water diversion plate 130 and disposed with the same sets of outlets with the water diversion holes. The several outlets and several sets of water diversion holes 122 are connected to each other correspondingly. In this embodiment, the outlets are strawberry water, spray water and shower water, but not limited to this. In this embodiment, the body 110 and the water diversion plate 120 are cooperated to form the control cavity.

Refer to the FIG. 2, FIG. 4, FIG. 5, FIG. 6 and FIG. 7, the inlet switch mechanism 300 disposed inside the inlet cavity includes a fixed rack 350, a pivot piece 310, a sealing piece 320, a control button 330 and an elastic piece 340. the fixed rack 350 is fixed inside the end of the handle 140, the lower end of the pivot piece 310 is pivot jointed to the inner revolution surface of the end of the fixed rack 350 of the fixed unit 100, the upper end is disposed with a ball rack 311; the sealing piece 320 is ball typed sealing ball and connected to the ball rack 311.

The elastic piece 340 is disposed below the pivot piece 310 and inside the inner wall of the handle 140, making the joint piece 310 suffered the elasticity upwards, the entry of the upper diversion waterway 114 is sealed by the sealing piece 320 normally, the entry of the lower diversion waterway 115 is connected to the inlet cavity normally, the upper cavity is connected to the inlet cavity normally. The control button 330 is sliding connected to the handle 140 and disposed with a control end outside the handle 140 of the fixed unit 100 and a withstanding end inside the inlet cavity of the fixed unit 100 to withstand the top of the joint piece 310, making the control button 330 overcoming the elasticity when the user presses it and the joint piece rotating downward, making the entry of the upper diversion waterway 114 connected to the inlet cavity, making the entry of the lower diversion waterway 115 sealed, making the lower cavity connected to the inlet cavity normally. In this embodiment, the control button 330 includes a lever 330 and a button 332. the handle is disposed with an assembly groove, which is disposed with a button rack 333 inside.

Figure 11:
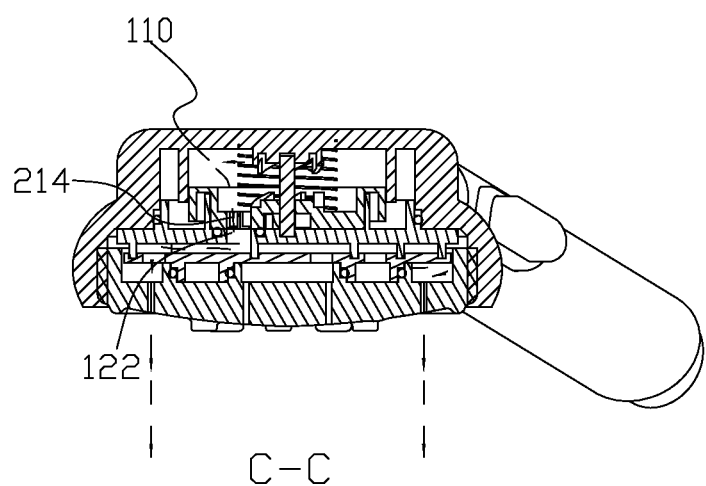
FIG. 11 illustrates the sectional view of the C-C in the FIG. 8 when the outlet device is situated in the third outlet function.

Refer to the FIG. 1 to the FIG. 11, the outlet switch mechanism 200 includes a switch plate 210, which includes a plate 211, an inner ring 212 extended upward from the outer periphery of the plate 211, a ring extended outwards from the upper periphery of the inner ring 212 and an outer ring 213 extended downward from the outer periphery of the ring. The portion inside the inner ring 212 of the plate 211 of the switch plate 210 is opened with inlet holes 214 corresponding to the water diversion holes. The central of the bottom surface of the plate 211 of the switch plate 210 is concaved to form a concaved cavity 215.

The outer revolution surface of the inner ring 212 of the switch plate 210 is coupled to the inner revolution surface of the lower inner periphery wall 121. the outer revolution surface of the outer ring 213 is coupled to the inner revolution surface of the upper inner periphery wall 112. the lower inner periphery wall 121 is disposed between the inner ring and the outer ring, making that: the switch plate 210 is disposed inside the fixed unit 100 and divides the control cavity into upper and lower cavity, the upper cavity is the portion above the switch plate 210 and inside the upper inner periphery wall 121, the lower cavity is the portion between the switch plate 210 and the water diversion plate 120 and between the trumpet shaped sleeve and the upper inner periphery wall; the upper cavity is connected to the lower diversion waterway, the lower cavity is connected to the upper diversion waterway; the switch plate 210 can move up and down, it is rotatably connected between the body 110 and the water diversion plate 120 and movably connected to the control cavity. In this embodiment, the outer revolution surface of the inner ring 212 and the inner revolution surface of the lower inner periphery wall 121 are movably connected without sealing. To ensure the coaxially rotation angle of the switch plate, it is better to disposed another shaft 216 to connect the body and the switch plate.

A withstand spring 220 is disposed between the switch plate 210 and the top board of the body 110.

The driving mechanism includes a first male ratchet 410, a second male ratchet 420, a first female ratchet 430 and a second female ratchet 440. the first male ratchet 410 is faced down and raised in the portion inside the upper inner periphery wall 112 of the bottom surface of the top board of the body and ring shaped arranged. The second male ratchet 420 is faced up and raised on the top surface of the plate 211 of the switch plate 210 and ring shaped arranged. The second female ratchet 440 is faced down and raised in the concaved cavity 215 of the switch plate 210 and ring shaped arranged. The first male ratchet 410 and the first female ratchet 430 are cooperated to form a structure like the automatic ball-point pen, the second male ratchet 420 and the second male ratchet 440 are cooperated to from a structure like the automatic ball-point pen.

An outlet switch method includes:

Step 00. the water is lead into the inlet cavity from the root waterway of the handle 140, the water is flowing into the lower, then into the upper cavity, the bottom surface of the switch plate 210 is hermetically contacted with the top surface of the plate of the water diversion plate 120 (with the effect of the withstanding spring 220 and the water pressure), the water is flowing through the inlet hole 214 of the switch plate 210, the first water diversion hole 122 of the water diversion plate 210 and then out of the first outlet function;

Step 11. press the control button 330, making the joint piece 310 rotating downward, the sealing piece move downward, the upper diversion waterway connected and the lower diversion waterway closed, the water is then flowing into the lower cavity;

Step 12. with the effect of the water of the lower cavity on the inner ring 212, the outer ring 213 and the ring of the switch plate 210, the switch plate 210 moves upward;

Step 13. the second female ratchet 440 of the switch plate 210 and the second male ratchet 420 of the water diversion plate 120 are separated, meanwhile the switch plate 210 stops rotating; the first female ratchet 430 of the switch plate 210 and the first male ratchet 410 of the body 110 are cooperated to make the switch plate 210 rotating 30 degrees forwards; in this step, the withstanding spring 220 is compressed and stored energy;

Step 14. release the control button 330, the joint piece 310 rotates upward with the elastic effect of the elastic piece 340, the sealing piece 320 moves upward, the lower diversion waterway is closed, the upper diversion waterway is connected, the water is flowing into the upper cavity;

Step 15. the water of the upper cavity is working on the switch plate 210, the withstand spring 220 releases the energy, making the switch plate 310 moves downward;

Step 16. the first female ratchet 430 of the switch plate 210 and the first male ratchet 410 of the body 110 are separated, the switch plate 210 stops rotating, the second female ratchet 440 of the switch plate 210 and the second male ratchet 420 of the water diversion plate 120 are cooperated to make the switch plate 210 rotating 30 degrees forward, the second water diversion hole of the second outlet function is corresponding to the inlet hole;

Step 20. the switch plate 210 is sealing contacted to the plate of the water diversion plate 120, the second outlet function works to outlet water.

The switch of the second outlet function and the third outlet function and the switch of the third outlet function and the first outlet function are in the same way.

In another preferred embodiment, the difference from the above embodiment is:

An outlet switch device includes a fixed unit, an outlet switch mechanism, an inlet switch mechanism and a driving mechanism. the switch of the outlet functions is realized by the relative rotation between the outlet switch mechanism and the fixed unit; the fixed unit includes a control cavity and an inlet waterway to connect to the external water source; the outlet switch mechanism includes a switch plate, the switch plate is movably connected inside the control cavity; an elastic piece is disposed between the switch plate and the fixed unit, the elasticity of the elastic piece makes the switch plate move forwards; the inlet switch mechanism controls the inlet waterway to make the water flowing into the control cavity, when the water flowing into the control cavity makes the switch plate compressing the elastic piece and move backwards; the driving mechanism exerts force to the switch plate and the fixed unit to transform the motion up and down of the switch plate to rotation.

An outlet switch method includes:

Step 00. the water is lead into the inlet cavity from the root waterway of the handle, the water is flowing into the lower, the bottom surface of the switch plate is hermetically contacted to the top surface of the plate of the water diversion plate (with the effect of the water pressure, the water pressure is larger than the elasticity of the elastic piece, the elastic piece stores energy), the water is flowing through the inlet hole of the switch plate, the first water diversion hole of the water diversion plate, and then out of the first outlet function;

Step 11. close the root waterway;

Step 12. the elastic piece releases the energy to work on the switch plate, making it move upward;

Step 13. the first female ratchet of the switch plate and the first male ratchet of the body are cooperated to make the switch plate rotating 30 degrees forward (the second female ratchet of the switch plate and the second male ratchet of the water diversion plate are separated and retained still);

Step 14. turn on the root waterway, the water is flowing into the upper cavity;

Step 15. the water of the upper cavity is working on the switch plate to make it move downward, the elastic piece is pressed to store energy;

Step 16. the second female ratchet of the switch plate and the second male ratchet of the water diversion plate are cooperated to make the switch plate rotating 30 degrees forward (the first female ratchet of the switch plate and the first male ratchet of the body are separated and retained still), the second water diversion hole of the second outlet function are corresponding to the inlet hole;

Step 20. the switch plate is hermetically contacted to the plate of the water diversion plate, the second outlet function works.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with an outlet switch device and an outlet switch method, which is applied with an inlet switch mechanism to control the inlet waterway to make the water flowing into the upper cavity or the lower cavity to make the switch plate move up and down with the effect of the water; the driving mechanism is working at the switch plate and the fixed unit to transform the motion up and down of the switch plate to rotation, realizing the switch of the outlet functions.

What is claimed is:
1. An outlet switch device, comprising:
a fixed unit,
an outlet switch mechanism,
an inlet switch mechanism and
a driving mechanism, wherein
switching the outlet function is realized through relative rotation between the outlet switch mechanism and the fixed unit;
the fixed unit includes a control cavity and an inlet waterway connected to an external water resource;
the outlet switch mechanism includes a switch plate, which is movably connected inside the control cavity and divides the control cavity into an upper cavity and a lower cavity;
the inlet switch mechanism controls the inlet waterway to control the water turning into the upper cavity or the lower cavity, making the switch plate move up and down with the effect of the water;
the driving mechanism is disposed between the switch plate and the fixed unit to transform the action up and down to rotation.

2. An outlet switch device according to claim 1, wherein the fixed unit includes a body and a water diversion plate, the body is hermetically fixed to the water diversion plate to form the control cavity;
a first male ratchet arranged in a ring and facing down is disposed at the bottom of the body,
a second male ratchet arranged in a ring and facing up is disposed on the top of the water diversion plate;
a first female ratchet arranged in a ring and facing up is disposed on the top face of the switch plate,
a second female ratchet arranged in a ring and facing down is disposed on the bottom face of the switch plate; wherein
when the water is flowing into the lower cavity, the switch plate moves up with the effect of the water, the first female ratchet and the first male ratchet cooperate together to make the switch plate rotate forward; and
when the water is flowing into the upper cavity, the switch plate moves down with the effect of the water, the second female ratchet and the second male ratchet cooperate together to make the switch plate rotate forward.

3. An outlet switch device according to claim 2, wherein several water diversion holes are arranged in a ring and disposed on the water diversion plate,
inlet holes are disposed on the switch plate throughout, the inlet holes corresponding to the water diversion holes;
the inlet waterway of the fixed unit includes a root waterway and two diversion waterways,
the inlet switch mechanism is disposed between the root waterway and the diversion waterways, making the diversion waterway connect to the upper cavity situated in a connection status and making the diversion waterway connect to the lower cavity situated in a closed status,
the inlet switch mechanism is controlled to trigger connecting the diversion waterway to the lower cavity, and closing the diversion waterway connected to the upper cavity.

4. An outlet switch device according to claim 3, wherein the inlet switch mechanism includes a sealing piece,
a control button and an elastic body, under the effect of the elasticity of the elastic body working at the sealing piece,
the sealing piece is hermetically connected to the diversion waterway of the lower cavity,
the control button is controlled by the user to make the sealing piece move to be hermetically connected to the diversion waterway of the upper cavity.

5. An outlet switch device according to claim 3, wherein a withstanding spring is disposed between the switch plate and the body.

6. An outlet switch device according to claim 3, wherein the fixed unit includes an outlet mechanism,
the outlet mechanism includes several outlet functions,
each outlet function is connected to the water diversion hole correspondingly.

7. An outlet switch device according to claim 4, wherein the inlet switch mechanism further includes a pivot piece,
a first end of the pivot piece is pivotally joined to the fixed unit,
a second end of the pivot piece is connected to the sealing piece,
the control button is slidably connected to the fixed unit, and
the control button is disposed with a control end outside the fixed unit and a withstanding end inside the fixed unit to withstand the pivot piece.

8. An outlet switch method, comprising the steps of:
controlling the inlet waterway to make the water source enter into the upper cavity or the lower cavity of the control cavity, the water in the upper or lower cavity making the switch plate move up and down, a driving mechanism transforming the motion up and down of the switch plate to rotation of the switch plate;
switching outlet functions by relative rotation between the switch plate and the fixed unit.

9. An outlet switch method according to the claim 8, wherein the step of controlling the inlet waterway includes:
controlling the inlet switch mechanism to make the water source enter into the lower cavity;
the water of the lower cavity making the switch plate move upward;
the driving mechanism transforming the motion upward of the switch plate to rotation forward of the switch plate;
releasing the controlling the inlet switch mechanism to make the water enter into the upper cavity;
the water of the upper cavity making the switch plate move downward;
the driving mechanism transforming the motion downward of the switch plate to rotation forward of the switch plate, the switch plate hermetically contacting the water diversion plate.

10. An outlet switch device, comprising:
a fixed unit,
an outlet switch mechanism,
an inlet switch mechanism, and
a driving mechanism, wherein
switching of the outlet functions is realized by relative rotation between the outlet switch mechanism and the fixed unit;
the fixed unit includes a control cavity and an inlet waterway to connect to an external water source;
the outlet switch mechanism includes a switch plate,
the switch plate is movably connected inside the control cavity;
an elastic piece is disposed between the switch plate and the fixed unit, the elasticity of the elastic piece making the switch plate move forwards; wherein
the inlet switch mechanism controls the inlet waterway to make the water flow into the control cavity, the water flowing into the control cavity making the switch plate compress the elastic piece and move backwards; and
the driving mechanism exerts force on the switch plate and the fixed unit to transform the motion up and down of the switch plate to rotation.

* * * * *